(12) United States Patent
Donahue

(10) Patent No.: US 8,607,943 B2
(45) Date of Patent: Dec. 17, 2013

(54) SHOCK ABSORBER

(75) Inventor: Joel Donahue, Novi, MI (US)

(73) Assignee: Hitachi Automotive Systems Americas Inc., Harrodsburg, KY (US)

( * ) Notice: Subject to any disclaimer, the term of this patent is extended or adjusted under 35 U.S.C. 154(b) by 12 days.

(21) Appl. No.: 13/227,725

(22) Filed: Sep. 8, 2011

(65) Prior Publication Data

US 2013/0062150 A1 Mar. 14, 2013

(51) Int. Cl.
*F16F 9/34* (2006.01)

(52) U.S. Cl.
USPC ............ 188/318; 267/64.15; 188/315

(58) Field of Classification Search
USPC ........... 188/282.1, 282.7, 282.8, 315, 322.13, 188/322.14, 322.15, 322.2, 318; 267/64.11, 267/64.15
See application file for complete search history.

(56) References Cited

U.S. PATENT DOCUMENTS

| | | | | |
|---|---|---|---|---|
| 4,325,468 A * | 4/1982 | Siorek | .................. | 188/282.8 |
| 5,507,475 A * | 4/1996 | Seel et al. | ................ | 267/64.12 |
| 5,522,486 A * | 6/1996 | Fulks et al. | .................. | 188/315 |
| 5,588,510 A * | 12/1996 | Wilke | ........................ | 188/266.6 |
| 6,474,629 B2 * | 11/2002 | Beck et al. | ................ | 267/64.16 |
| 7,448,479 B2 * | 11/2008 | Fukuda et al. | ............. | 188/322.2 |
| 2004/0251097 A1 * | 12/2004 | Barbison et al. | ............. | 188/315 |
| 2008/0251331 A1 * | 10/2008 | Mangelschots et al. | ... | 188/266.6 |

* cited by examiner

*Primary Examiner* — Christopher Schwartz
(74) *Attorney, Agent, or Firm* — Gifford, Krass, Sprinkle, Anderson & Citkowski, P.C.

(57) ABSTRACT

A shock absorber having an elongated pressure tube and a piston slidably mounted in the pressure tube which divides the pressure tube into a first and second working chamber. An elongated piston rod is attached to the piston and moves in unison with the piston in both an extended and a compression direction. Movement of the rod in a compression direction decreases the volume of the first working chamber and increases the volume of the second working chamber, and vice versa. A control orifice and adaptive valve are fluidly connected in series between the first working chamber and a reservoir. A check valve is fluidly connected between the control orifice and the adaptive valve which opens only upon movement of the rod in a compression direction.

7 Claims, 2 Drawing Sheets

SHOCK ABSORBER

BACKGROUND OF THE INVENTION

I. Field of the Invention

The present invention relates generally to shock absorbers and, more particularly, to shock absorbers having an adjustable dampening force and of the type used on automotive vehicles.

II. Description of Related Art

Modern day shock absorbers of the type used on automotive vehicles typically include an elongated pressure tube having a piston slidably disposed within the pressure tube. The piston divides the pressure tube into a first and second working chamber on opposite sides of the piston.

An elongated piston rod is attached to the piston so that the rod moves in unison with the piston. The rod and piston are movable both in an extension direction and a compression direction. In the extension direction, the piston rod extends outwardly from the pressure tube. Conversely, in the compression direction, the piston rod is retracted into the pressure tube.

A cylinder is disposed around and spaced outwardly from the pressure tube thus forming a reservoir in the shock absorber. A control orifice and adaptive valve are then fluidly connected in series between one of the working chambers and the reservoir. Restriction of a flow between the first working chamber and the reservoir thus dampens the force applied to the shock absorber in the extension direction. In addition, one-way valves formed between the reservoir and the second working chamber, as well as check valves and restricted orifices formed in the piston, allow flow between the first and second working chambers in a controlled and dampened fashion. The working chambers as well as the reservoir are filled with hydraulic oil.

One disadvantage of these previously known shock absorbers occurs during severe events, such as when the vehicle tire encounters a pothole. In this event, the extreme and rapid movement of the shock absorber in the extension direction can result not only in damage to the tire, but even structural damage to the wheel.

Ideally, movement of the shock absorber in the extension direction should be limited during severe events, such as when the vehicle tire encounters a pothole, while still permitting rapid movement of the vehicle tire and shock absorber in the compression direction. Although there have been attempts to control the operation of the software to meet these design criteria, such intelligent software have not proven wholly successful and are also expensive to implement.

SUMMARY OF THE PRESENT INVENTION

The present invention provides a passive element integral to the shock absorber design for use with automotive shock absorbers having adaptive valves which overcomes the above-mentioned disadvantages of the previously known shock absorbers.

In brief, the shock absorber of the present invention comprises an elongated pressure tube having one end secured to an automotive vehicle. A piston having an elongated piston rod is slidably disposed in the pressure tube so that the pressure rod extends outwardly from the other end of the pressure tube. This piston, furthermore, divides the pressure tube into a first and second working chamber.

The piston rod itself is connected to the wheel. Consequently, movement of the piston in a compression direction increases the volume of the first working chamber and simultaneously decreases the volume in the second working chamber. Movement of the piston in the extension direction decreases the area of the first working chamber and increases the area of the second working chamber.

A control orifice and an adaptive valve are connected in series between the first working chamber and the reservoir. The adaptive valve restricts the fluid flow from the first working chamber to the reservoir. This adaptive valve is also adjustable so that the characteristics of the shock absorber may be varied between "hard" and "soft".

The restricted orifice is selected to limit the rapid movement of the piston rod, and thus the wheel, in the extension direction. However, in order to enable rapid compression, a one-way check valve is fluidly coupled between the second working chamber and in between the control orifice and the adaptive valve. Consequently, upon sudden movement of the shock absorber in a compression direction, the check valve opens to allow the hydraulic oil to the adaptive valve without first flowing through a restricted control orifice.

The check valve thus provides a passive mechanism to rapidly increase the flow from the second working chamber only during movement of the piston rod in the compression direction. This, in turn, reduces the likelihood of structural or tire damage even during severe events, such as when a pothole is encountered.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
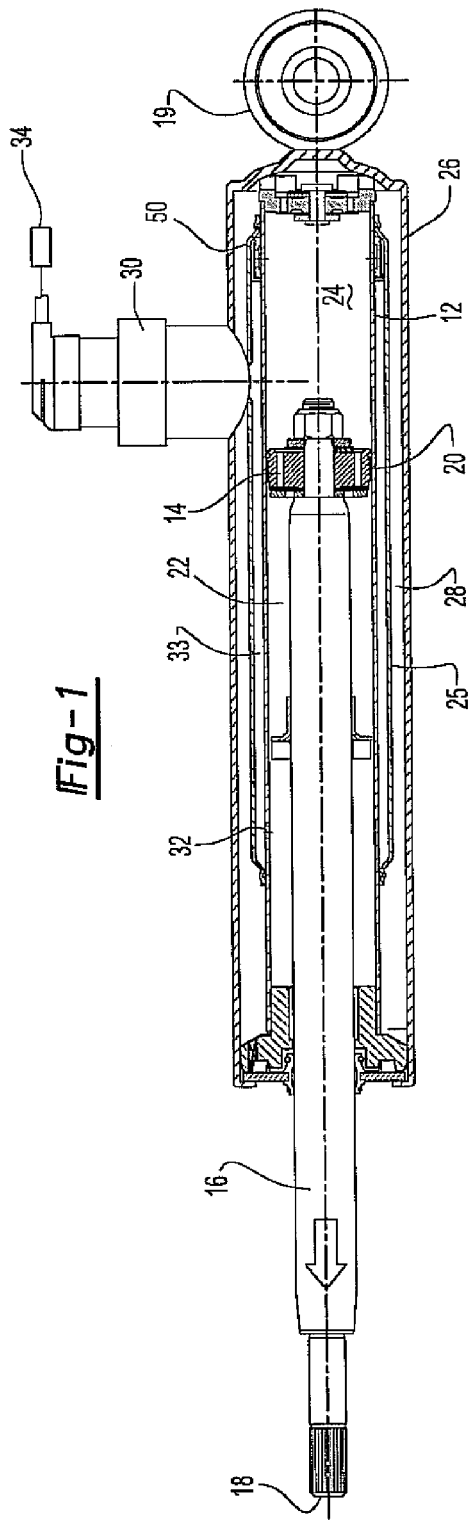
FIG. 1 is a longitudinal sectional view illustrating a preferred embodiment of the present invention.
Figure 2:
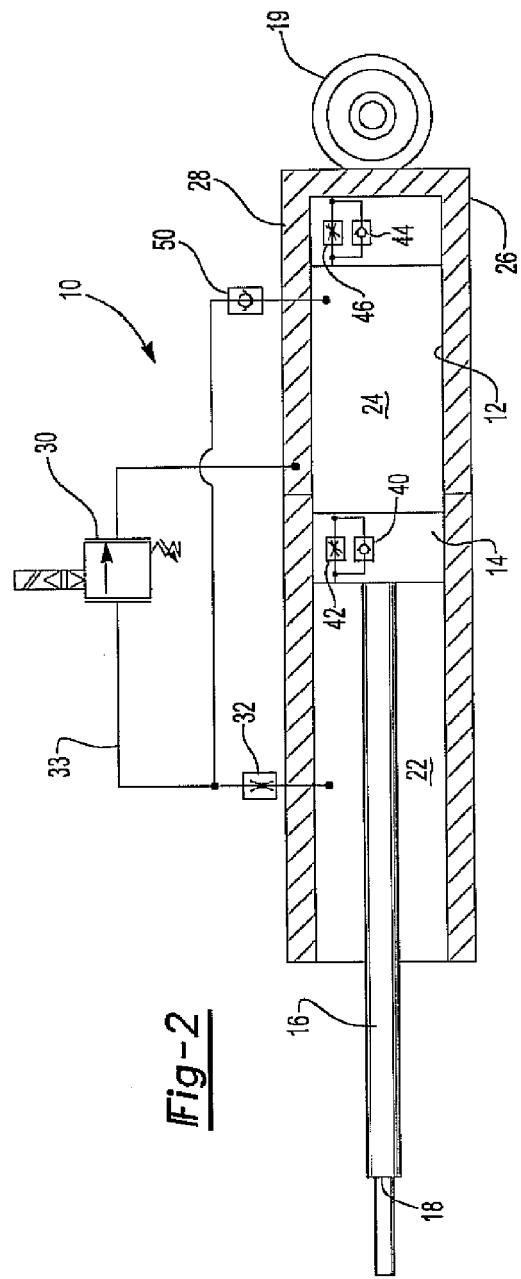
FIG. 2 is a schematic view illustrating the shock absorber of the present invention.

With reference first to FIGS. 1 and 2, a preferred embodiment of a shock absorber 10 according to the present invention is shown. The shock absorber 10 includes a pressure tube 12 which is elongated and circular in cross-sectional shape. A piston 14 is longitudinally slidably mounted within the pressure tube 12. An elongated piston rod 16 is attached to the piston 14 and has one end which extends outwardly from the pressure tube 12. An end 18 of the rod 16 is adapted for connection with the wheel of an automotive vehicle while the opposite end 19 of the shock absorber 10 is adapted for connection to the frame of an automotive vehicle.

Still referring to FIGS. 1 and 2, the piston 14 includes outer seals 20 which sealingly engage the inner walls of the pressure tube 12. In doing so, the piston 14 divides the pressure tube into a first working chamber 22 and a second working chamber 24. Sliding movement of the piston 14 and piston rod 16 in an extension direction decreases the volume of the first working chamber 22 and increases the volume of the second working chamber 24. Conversely, compression or retraction of the piston rod 16 into the pressure tube 12 increases the volume of the first working chamber 22 and simultaneously decreases the volume of the second working chamber 24.

A separator tube 25 is disposed around and spaced outwardly from the pressure tube 12. A tubular and cylindrical cylinder 26 in turn is disposed around both the pressure tube 12 and the separator tube 25. In doing so, a reservoir 28 is formed between the separator tube 25 and the cylinder 26. This reservoir 28, as well as the working chambers 22 and 24, are filled with a hydraulic fluid.

An adaptive valve 30 is attached to the cylinder 26. The adaptive valve 30 has an inlet fluidly connected to the first working chamber 22 through a control orifice 32 and a passageway 33 formed between the separator tube 25 and the pressure tube. The control orifice 32 has a fixed cross-sectional area which restricts the flow of hydraulic fluid through the control orifice 32. An outlet from the adaptive valve is open to the reservoir 28.

The adaptive valve 30 operates in the conventional fashion typically in response to an electric signal from a processor 34 on the vehicle. Depending upon the signal from the processor 34, the adaptive valve 30 varies the flow restriction through the adaptive valve so that the operating characteristics of the shock absorber 10 may be varied between a "hard" and a "soft" ride.

As best shown in FIG. 2, the adaptive valve 30 is fluidly connected in series between the control orifice 32 and the reservoir 28.

As best shown in FIG. 2, a check valve 40 and meter orifice 42 are mounted on the piston 14 and fluidly connected between the first and second working chambers 22 and 24. Similarly, a check valve 44 and meter orifice 46 are provided between the reservoir 28 and the second working chamber 24 to allow flow of hydraulic fluid during selected operating conditions.

The shock absorber 10 thus far described is conventional in construction. Unlike the previously known shock absorbers, however, the present invention further includes a check valve 50 having an inlet open to the second working chamber 24 and its outlet fluidly connected in between the control orifice 32 and the adaptive valve 30. The flow rate capacity of the check valve 50 is many times the flow rate of the control orifice 32 so that essentially unrestricted flow of hydraulic fluid is enabled between the second working chamber 24 and the adaptive valve 30 through the passageway 33 during compression or retraction of the piston rod 16 into the pressure tube 12. Conversely, during movement of the piston 14 and piston rod 16 toward an extended position, the valve 50 closes so that the outflow of hydraulic fluid from the first working chamber 22 is controlled, and thus limited, by the control orifice 32.

In operation, when the shock absorber incurs an extreme condition, such as a pothole, in which the piston rod and piston 14 rapidly move in an extended direction, the control orifice 32 and adaptive valve 30 control the flow rate of hydraulic fluid from the first working chamber 22 and to the reservoir 28. This, in turn, limits the speed of movement of the piston 14, and thus the vehicle wheel, in an extended direction. This limitation of movement is desirable to protect not only the vehicle wheel, but also the components of the suspension system. Furthermore, during movement of the piston 14 in the extended direction, hydraulic fluid flows from the reservoir 28, through the metered orifice 46 and/or check valve 44 into the second working chamber.

Conversely, when the wheel hits a bump, such as the end of a pothole, the piston rod 16 and piston 14 are forced rapidly in a compression direction. When this occurs, the piston 14 rapidly pumps hydraulic fluid from the second working chamber 24 to the reservoir 28 through the passageway 33 and the adaptive valve 30. Since the flow rate through the check valve 50 is much greater than the control orifice 32, a much more rapid movement of the piston 14 and piston rod 16 in the compression direction as compared to the extension direction is achieved. Furthermore, during compression hydraulic fluid also flows from the second working chamber 24 to the first working chamber 22 through the metering orifice 42 and/or check valve 40.

Figure 3:
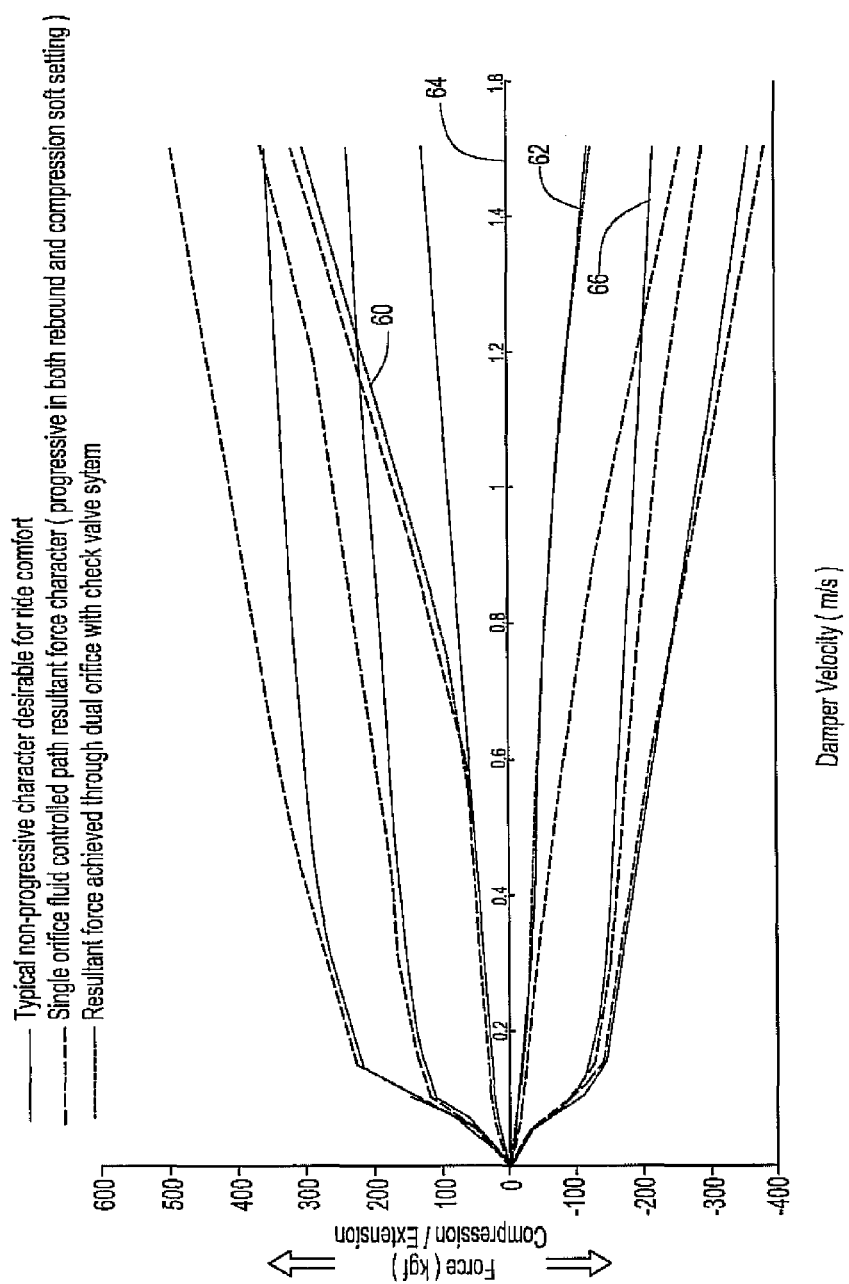
FIG. 3 is a graph illustrating the operation of the shock absorber of the present invention.

With reference now to FIG. 3, a graph illustrating the operation of the present invention in both extension 60 and compression 62 as contrasted to the operation of a baseline shock absorber in both the extension 64 and compression 66 force situations. As is clear from the graphs, the present invention provides progressive increased dampening during movement of the piston 14 and piston rod 16 in the extension or rebound direction without sacrificing dampening during compressive movement of the piston and resultant comfort.

Having described my invention, many modifications thereto will become apparent to those skilled in the art to which it pertains without deviation from the spirit of the invention as defined by the scope of the appended claims.

I claim:

1. A shock absorber comprising:
   an elongated pressure tube,
   a piston slidably disposed in said pressure tube and dividing said pressure tube into a first and second working chamber,
   an elongated piston rod attached to said piston, said rod being movable in both an extended and a compressed direction relative to said pressure tube,
   wherein movement of said rod in said compression direction decreases the volume of said second working chamber and increases the volume of said first working chamber, and vice versa for movement in the extended direction,
   a reservoir,
   a control orifice and an adaptive valve fluidly connected in series between said first working chamber and said reservoir, and
   a check valve fluidly connected between said control orifice and said second working chamber which opens only upon movement of said rod in said compression direction, said check valve having a flow rate many times the flow rate of said control orifice.

2. The shock absorber as defined in claim 1 and comprising a cylinder disposed around said pressure tube, said reservoir being formed between said pressure tube and said cylinder.

3. The shock absorber as defined in claim 1 and comprising a variable orifice fluidly connecting said second working chamber and said reservoir.

4. The shock absorber as defined in claim 1 and comprising a check valve fluidly connecting said reservoir to said second working chamber which opens only when said piston moves in said extended direction.

5. The shock absorber as defined in claim 1 and comprising a variable orifice mounted on said piston and fluidly connecting said working chambers together.

6. The shock absorber as defined in claim 1 and comprising a check valve mounted on said piston and fluidly connecting said working chambers together, wherein said check valve opens only during movement of said piston in said compression direction.

7. The shock absorber as defined in claim 1 and comprising a separator tube disposed around said pressure tube, said separator tube forming a fluid passageway between both said first and second working chambers and said adaptive valve.

* * * * *